No. 872,304. PATENTED NOV. 26, 1907.

E. PHILLIPSON.
VALVE.
APPLICATION FILED OCT. 19, 1906.

WITNESSES:

INVENTOR
Emil Phillipson
BY
his ATTORNEYS

UNITED STATES PATENT OFFICE.

EMIL PHILLIPSON, OF NEW YORK, N. Y., ASSIGNOR TO PHILLIPSON VALVE CO., A CORPORATION OF NEW YORK.

VALVE.

No. 872,304.  Specification of Letters Patent.  Patented Nov. 26, 1907.

Application filed October 19, 1906. Serial No. 339,589.

*To all whom it may concern:*

Be it known that I, EMIL PHILLIPSON, a citizen of the United States, residing at the city of New York, borough of Manhattan, in the county and State of New York, have invented certain new and useful Improvements in Valves, of which the following is a full, clear, and exact specification.

My invention relates to improvements in means for controlling the flow or transfer to or from a container or receptacle, and the same has for its object more particularly to provide a simple, efficient and reliable valve in which the valve face may be positively moved into and out of engagement with its seat, and positively held to any of its intermediate positions.

Further, said invention has for its object to provide a valve in which the valve face may be quickly moved into and out of engagement with its seat, without necessitating the turning of the valve face relatively to its seat.

Further, said invention has for its object to provide a valve capable of withstanding fluids under high pressure, and permit of the transfer of said fluids without liability of leakage or loss.

To the attainment of the aforesaid objects and ends my invention consists in the novel details of construction, and in the combination, connection and arrangement of parts hereinafter more fully described, and then pointed out in the claims.

Figure 1:
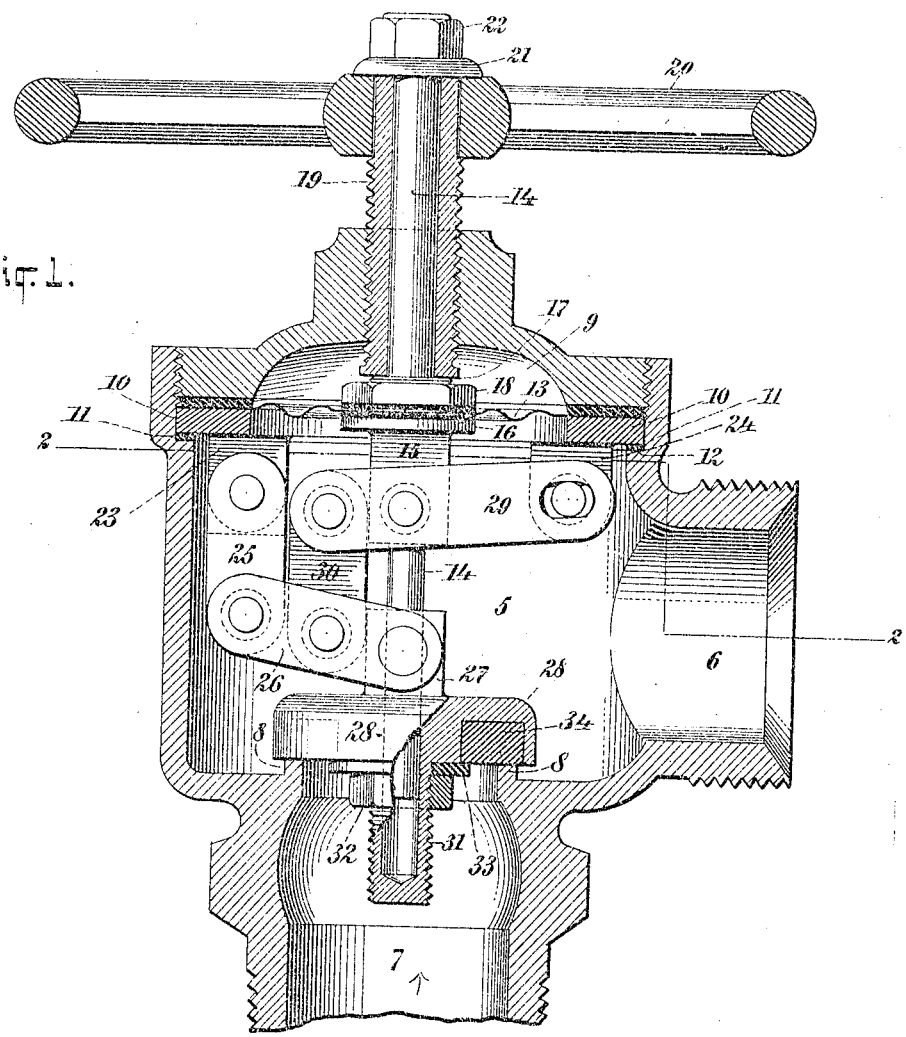
Figure 2:
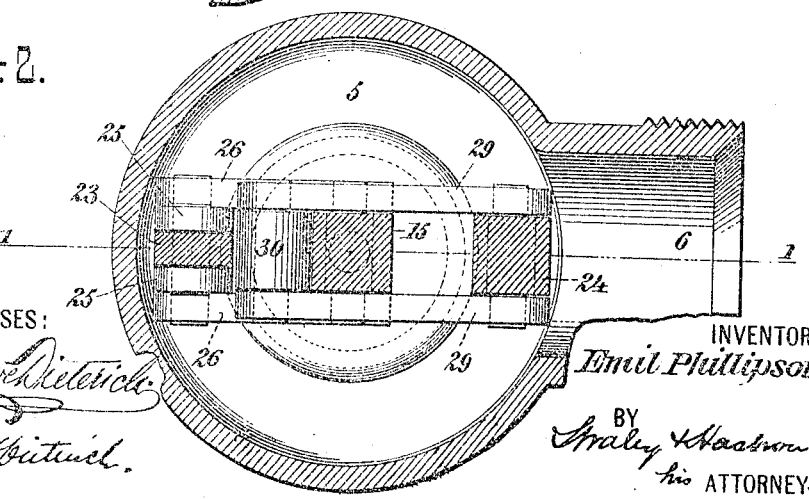

In the accompanying drawings forming part of this specification wherein like numerals of reference indicate like parts, Figure 1 is a central vertical section taken approximately on the line 1—1 of Fig. 2, showing one form of a valve constructed according to, and embodying my said invention, and Fig. 2 is a section taken on the line 2—2 of Fig. 1.

In said drawings 5 designates a valve casing which is made cylindrical in form and provided with an inlet portion 7, and a nozzle 6, both provided upon their outer surfaces with screw threads by means of which the valve may be secured to a container at one portion, and to a pipe, hose or a second receptacle at its other end.

8 denotes a valve seat provided upon the bottom of the casing 5 at the inner end of the nozzle 6.

The upper portion of the casing 5 is screw-threaded upon its inner surface and adapted to receive a cover or top 9, and 10 denotes an annular plate which is supported in the upper portion of the valve upon a shoulder 11. Between the underside of said annular plate 10, and the shoulder 11 is disposed a packing or gasket 12, and between the upper surface of said annular plate 10 and the under side of the cover or top 9 is disposed a flexible diaphragm 13.

14 denotes a stem which extends through the diaphragm 13 and is provided about midway of its height with a squared portion 15 and a base 16, upon which rests the diaphragm 13. Above said diaphragm said stem 14 is provided with a short threaded portion 17 upon which is disposed a nut 18 bearing against the upper surface of said diaphragm and serving to hold the stem 14 secured thereto.

15$^a$ 15$^a$ denote disks of packing interposed between the base 16, and nut 18 on the stem 14, and the upper and lower surfaces of the diaphragm 13. Surrounding the upper portion of the stem 14 is a sleeve 19 which is screw-threaded upon its outer surface and works in a threaded aperture provided in the top 9. The lower end of said sleeve 19 is adapted to bear upon the short threaded portion 17, of the stem 14, and the upper projecting end of said sleeve 19 is squared to receive a hand-wheel 20 which is held in place thereon by a washer 21, and a nut 22 secured upon the extreme upper, threaded end of the stem 14.

Upon the underside of the annular plate 10 are provided opposite-located lugs 23, 24. To the lug 23 are pivotally secured the upper ends of vertical links 25, 25, to the lower ends of which are secured levers 26, 26. The other ends of said levers 26, 26 being pivotally secured to a square boss 27 provided upon the upper surface of a valve 28.

To the lug 24 are pivotally secured the slotted ends of levers 29, 29 which are pivotally secured intermediate their ends to the squared portion 15 of the stem 14, and at their other ends to the upper end of a link 30 which is pivotally secured at its lower end to the levers 26, 26 at a point intermediate their pivoted ends.

The valve 28 is provided with a depending socket member 31 having upon its outer surface screw threads upon which is disposed a nut 32 serving with a washer 33 to hold a resilient or other face 34 in position in the recessed underside of the valve. The valve 28 is provided with a central recess or socket which is adapted to receive the lower end of the stem 14, and thus afford the valve a small movement upon said stem.

In the operation of the valve a small amount of rotation imparted to the sleeve 19 will cause the stem 14 and its attached parts to move vertically and by means of the compound levers 26, 26, 29, 29 the said movement will be magnified and the valve caused to descend upon the lower end of the stem 14, and be held tightly against its seat.

Having thus described my said invention, what I claim and desire to secure by Letters Patent is:

1. A valve comprising a casing, a non-rotating reciprocable stem therein, a valve in said casing adapted for longitudinal movement on said stem, a plurality of levers connected to said valve and stem, and a revoluble member for actuating said levers and operating said valve, substantially as specified.

2. A valve comprising a casing, a non-rotating reciprocable stem therein, a valve arranged upon said stem and adapted for longitudinal movement thereon, a plurality of connected levers connected to said valve and stem, and means for actuating said levers to seat said valve, substantially as specified.

3. A valve comprising a casing, a non-rotating reciprocable stem therein, a valve on said stem adapted to move longitudinally thereon a plurality of levers pivotally supported in said casing and connected with each other and to said valve and stem, and means for actuating said levers, substantially as specified.

4. A valve comprising a casing, a non-rotating reciprocable stem therein, a valve on said stem, a plurality of levers pivotally supported in said casing, and secured to said stem and valve, links connecting said levers, and means for reciprocating said stem and actuating said levers, substantially as specified.

5. A valve comprising a casing, a non-rotating reciprocable stem therein, a valve on said stem, a plurality of levers pivotally supported in said casing, links connecting said levers, and a revoluble member for reciprocating said stem and actuating said levers to seat said valve, substantially as specified.

6. A valve comprising a casing, a diaphragm therein, a reciprocable stem in said casing and secured to said diaphragm, a valve on said stem, a plurality of levers supported in said casing and connected with each other and to said stem and valve, and means for reciprocating said stem and actuating said levers to seat said valve, substantially as specified.

7. A valve comprising a casing, a diaphragm therein, a non-rotating reciprocable stem in said casing and secured to said diaphragm, a valve on said stem a plurality of levers pivotally secured together and to said valve and stem, and a revoluble threaded sleeve surrounding the upper end of said valve stem, and adapted to work in said casing for reciprocating said stem and seating said valve, substantially as specified.

8. A valve comprising a casing, a non-rotating reciprocable stem in said casing, a valve on said stem adapted for longitudinal movement thereon, a plurality of levers pivotally secured together and to said valve and stem, a revoluble threaded sleeve arranged upon and surrounding said stem adapted to work in said casing for reciprocating said stem and seating said valve, and means arranged upon said sleeve for actuating the same, substantially as specified.

9. A valve comprising a casing, a diaphragm therein, a stem secured to said diaphragm partly above and partly below the same, a threaded sleeve disposed upon the upper end of said stem and adapted to work in said casing, means for rotating said sleeve, a valve having a hollow, depending socket member, and fitted upon the lower end of said stem, an annular plate secured in said casing below said diaphragm, lugs arranged upon the underside thereof, a lever pivotally secured to one of said lugs and said valve stem, a link pivotally secured to the other of said links, a lever pivotally secured to said link and said valve, and a link connecting said levers, substantially as specified.

10. A valve comprising a casing, a diaphragm therein, a non-rotating reciprocable stem in said casing and secured to said diaphragm, a valve, a plurality of levers pivotally secured together and to said valve and stem, and a revoluble sleeve surrounding the upper end of said valve stem, adapted to work within said casing for reciprocating said stem and seating said valve, substantially as specified.

Signed at the city of New York, in the county and State of New York, the 18th day of October, nineteen hundred and six.

EMIL PHILLIPSON.

Witnesses:
　CONRAD A. DIETERICH,
　EARLE H. HOUGHTALING.